March 16, 1954 L. H. A. FOULON 2,672,209
APPARATUS FOR COLLECTING DUST BY USE OF FOAM
Filed Jan. 25, 1952

INVENTOR:
LOUIS HENRI FOULON
By: Young, Emery & Thompson
Att'ys

Patented Mar. 16, 1954

2,672,209

UNITED STATES PATENT OFFICE 2,672,209

APPARATUS FOR COLLECTING DUST BY USE OF FOAM

Louis Henri Alexandre Foulon, Henin Lietard, France

Application January 25, 1952, Serial No. 268,161

Claims priority, application France January 27, 1951

2 Claims. (Cl. 183—8)

It is known that large quantities of dust are produced in industrial plants and particularly in collieries, quarries, textile or chemical factories, and that such dust constitutes a permanent danger because it is liable to give rise to clouds which in some cases may propagate or cause fires and explosions. Such dust is also very noxious and detrimental for workers because it penetrates into their lungs and becomes the origin of pulmonary diseases.

Numerous attempts have been made heretofore for checking the production and propagation of industrial dust, particularly by resorting to ventilating or sucking schemes. In collieries and similar mines, attempts were also made for neutralizing such noxious dust by a method sometimes known as "schistification." However the results which were obtained were often of an illusory nature.

In contradistinction to the known attempts made heretofore, the invention has for its primary object to provide a novel apparatus consisting according to a chief feature and means for isolating, confining or fixing dust by means of a light foam produced in the form of layers or screens, said foam possessing an adequate superficial wetting power as well as satisfactory stability and ability to swell or expand into many times its volume.

Another object of the invention is to provide an apparatus as aforesaid presenting this additional feature that the foam is preferably given such a consistency that its constitutive bubbles have a diameter comprised approximately between one millimeter and ten millimeters, the thickness of the foam film being comprised between approximately one micron and ten microns (one micron being one thousandth of a millimeter) under normal conditions.

A further object of the invention is to provide an apparatus as aforesaid wherein, as a supplementary feature, in order to take into consideration the fact that the surface tension of water is too large to wet fine dust under satisfactory conditions, there is added to the foam-forming liquid agents having wetting or tensioactive properties to increase the moistening power versus fatty or semi-fatty substances such as coal. Such tensioactive substances contain in their molecule carbonated chains linked at one end to an active or hydrophile group. When the foam is being produced, the molecules of such tensioactive substances are distributed over the outer surface of the bubbles for forming a monomolecular film. The active group is in actual contact with the bubble water, and the outwardly directed carbonated chain comes into contact with the surface so that such molecules of the tensioactive substance interconnect or bind together the moistening water and the dust to be moistened.

As a moistening agent, use can be advantageously made of an arylalkylsulphonate or, alternatively, any other products possessing equivalent properties. Such product is in the form of a very light powder chiefly made of sodium arylalkylsulphonate and sodium sulphate, the group $NaSO_3$ constituting the active element in the carbonated chain of the arylalkylsulphonate. Even at very low concentrations, such product materially reduces the surface tension of water and consequently increases the moistening power of the dust-fixing foam. Theoretically speaking, it is only sufficient that the quantity of added moistening agent should be able to form a monomolecular layer upon the outer face of the bubbles for reducing by fifty per cent the value of the surface tension. Moistening of the dust by foam action lies on the same principle and the formation of a monomolecular layer of arylalkylsulphonate on the surface of the foam bubbles is sufficient for moistening very fine dust particles. This corresponds to a very low content in arylalkylsulphonate in the foam-forming liquid.

A still further feature of the invention is to provide an apparatus for carrying into practice the aforesaid method and having its several parts or elements constructed, combined and adapted to operate as hereafter described.

The apparatus according to the invention involves the recommendable step of adding to the foam-forming liquid at least one stabilizing compound so as to give the bubbles a satisfactory durability. The foam is preferably given the maximum of expansion or swell. The word "swell" is used here to refer to the ratio between the volume of foam obtained and the volume of liquid used for forming the foam. Such intensive swell is obtained by splashing and decanting the foam prior to its use. However the foam may also be used, at least for certain uses, without substantial decantation. Such intense swell to which corresponds in the foam a minimum of entrained water has for its chief advantage to fix and moisten the dust particles according to requirements without wetting the lumps of coal of subjacent layers.

In order to apply the present dust-moistening process by means of a foam produced according to the invention, the foam is advantageously generated in the form of layers, screens, curtains or aprons where the dust is most intensely produced for example adjacent coal conveyors or where the lumps of coal fall freely by gravity v. g. at the pouring end of a power head. The dust-fixing layer of foam is preferably given a sufficient width for causing the dust particles to come into contact with said foam layer which should preferably extend at right angles to the conveyor.

The apparatus which, as aforesaid, is also involved in the ambit of the invention comprises a foam generator receiving foaming liquid and air, means for supplying this liquid and air to said device in such adequate quantities as to produce the desired swell, means for leading and eventually decanting the resultant foam, and a distributor having properly sized apertures for generating the foam layer or screen.

The apparatus as aforesaid may comprise ducts for feeding the foam generator with the wetting liquid (preferably through a constant level container) and compressed air through a pressure reducer, the liquid and air being preferably filtered. The portion of the apparatus in which the foam is produced is surmounted by a vertical decantor tube and communicates with a horizontal pipe carrying the distributor. The outlet apertures provided in the latter are delineated by carefully machined metal blades the lower ends of which are sharpened so as to prevent the foam from adhering thereto.

In the accompanying drawings which form a part of the present disclosure and which are given by way of non-limitative illustration of the apparatus:

Figure 1:
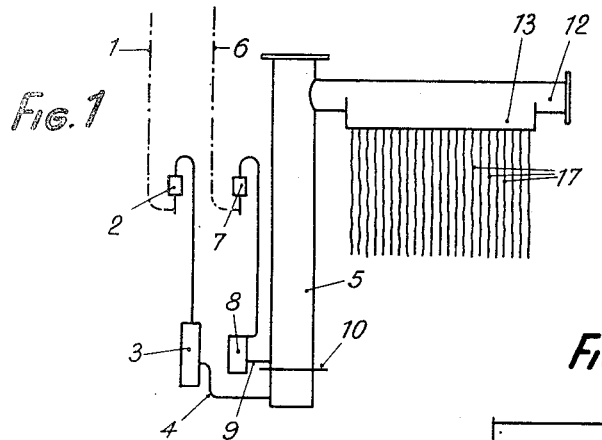
Fig. 1 is a diagrammatic view of the entire foam-producing apparatus.
Figure 3:
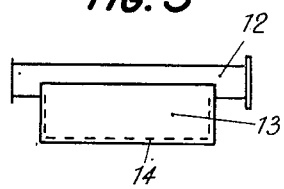
Fig. 3 is a plan view of the distributor.

As shown in Fig. 1, the apparatus comprises a compressed air supply duct 1 carrying a filter 2 and leading to a pressure reducer 3 adapted to furnish the air under a pressure which may vary between 50 and 300 grams per square centimeter. A duct 4 interconnects the pressure reducer 3 and the lower end of a vertically extending tube 5 the function of which is hereafter set forth. A duct 6 is provided for feeding the liquid through a filter 7 and leads to a constant level container 8.

The liquid fed through the duct 6 is advantageously an aqueous solution of the following components:

1% of a moistening agent such as sodium arylalkylsulphonate, as above stated,

1% of a stabilizing agent. This expression means a stabilizing agent constituted by proteins which are degraded by hydrolysis in the warm state in an alkaline medium in the presence of lime and are afterwards stabilized by a two-valent metallic salt.

A duct connects the constant level container to the tube 5, this duct 9 being however separated from the duct 4 originating at the pressure reducer 3 by a plate or slab 19 of porous sintered glass or keramic substance. The entirety made up of such ducts and glass plate or slab forms the foam generator.

Figure 2:
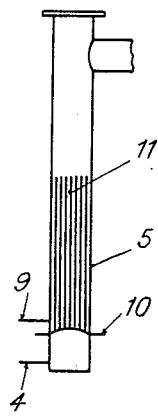
Fig. 2 is a sectional view of the decanting part of this apparatus.

As shown by Fig. 2, the portion of the tube 5 situated over the glass plate or slab 10 contains pieces of crimped metal foil 11 which are corrugated, buckled up or curled into spiral shape and are adapted to provide a very large contact surface so as to permit the foam to become decanted. The same result may be also obtained by means of sheets of metal or plastic material.

Figure 4:
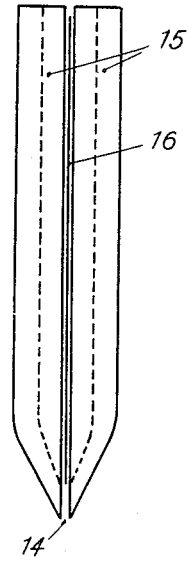
Fig. 4 is a view drawn on a larger scale showing the blades defining the foam outlet apertures.

The upper portion of the tube 5 communicates with a horizontally extending tube 12 which carries the foam distributor 13 having slits 14 through which the foam comes out. As shown by Fig. 4, the outlet slits 14 are defined by accurately machined blades 15 advantageously made of copper. Such blades are separated by a suitably cut metal foil 16 the thickness of which defines the width of the slit 14.

As illustrated by Fig. 1, strings or thin ropes 17 are preferably hung from the foam distributor 13 for slowing down the fall of the foam.

The operation of the apparatus is as follows:

After having so arranged the distributing head 13 as to obtain a layer of foam flowing in suitable manner for fixing the dust particles, the inflow of compressed air and liquid through the ducts 1 and 6 is controlled by regulating the delivery of the apparatus with the aid of the pressure reducer 3. The air flows through the porous glass plate 10 and forms with the incoming liquid small bubbles which rise through the tube 5 while becoming decanted over the large area metal foil 11. Liquid thus trickles down in the tube 5 in which it is formed for giving rise to other bubbles. The ratio of decantation may be adjusted by varying the area of the metal foil 11. The resultant foam then flows from the tube 5 into the tube 12, then into the distributor 13 and comes out through the slits 14 and slowly falls, through the atmosphere while being slowed down by the strings 17. A foam screen is thus generated the size and flowing rate of which may be adjusted to suit requirements.

As above described, very small quantities of liquid are sufficient for forming the foam screen which, owing to its moistening power, acts in satisfactory fashion even on very fine dust particles which could not be fixed by another method.

The apparatus as above described may be varied in a plurality of ways:

(a) The foam may be produced in a simple container to which the compressed air and liquid feeding ducts lead. This modification is suitable when it is not desired to cause the foam to swell to a large extent.

(b) The feed may be performed by the wetting liquid supplied under pressure through a micrometric slit. The liquid ejected at a high speed through this slit in the form of a thin film draws along the air which is necessary for forming the bubbles. This arrangement permits the supply of compressed air to be dispensed with.

(c) The distributor may be connected to the decanting pipe by a flexible union permitting the same to be retracted. An apparatus thus built may be positioned for example above a very dusty coal conveyor. The distributor may be retracted should an extraordinarily big lump of coal pass through it and may resume its normal position immediately after. In this particular instance, a series of similar apparatuses may be evenly distributed along the coal conveyor.

(d) The distributor may be constituted by standardized elements connected end to end for giving the foam screen the most suitable shape and size.

Minor constructional details of the apparatus as above described may be varied without departing from the scope of the subjoined claims.

What is claimed is:

1. In an apparatus for producing foam for collecting dust from a dust forming region comprising a porous plate, a vertical tube at the lower part of which said plate is accommodated, means for supplying air under pressure to the under surface of said porous plate, and means for supplying a foaming liquid to the upper surface of said plate so as to force air through said plate and liquid for producing a foam; the combination of decanting metal foils arranged vertically within said tube for promoting the decantation of the foam, a horizontal tube communicating with the upper portion of said vertical tube above said metal foils, a row of distributing apertures provided in said horizontal tube, and accurately fitting metal blades carried by said horizontal tube and positioned so as to define distributing slits from said apertures, said metal blades having sharpened ends so as to prevent the foam from adhering thereto, for producing foam layers or screens surrounding the dust-forming region and for preventing said dust from being diffused and spread into the atmosphere.

2. In an apparatus for producing foam according to claim 1, strings suspended below said distributing means for slowing down the falling speed of the foam and thus promoting its dust-moistening action.

LOUIS HENRI ALEXANDRE FOULON.

References Cited in the file of this patent

UNITED STATES PATENTS

| Number | Name | Date |
|---|---|---|
| 1,519,428 | Wilisch | Dec. 16, 1924 |
| 1,737,624 | Thomson | Dec. 3, 1929 |
| 1,740,840 | Schnabel | Dec. 24, 1929 |
| 1,850,143 | Schurmeyer | Mar. 22, 1932 |
| 1,922,749 | Roush | Aug. 15, 1933 |
| 1,959,945 | Bowman | May 22, 1934 |
| 2,508,227 | Clifford | May 16, 1950 |

FOREIGN PATENTS

| Number | Country | Date |
|---|---|---|
| 172,115 | Switzerland | Dec. 17, 1934 |